March 15, 1927.                 W. H. CLEVELAND ET AL                  1,621,479
                          RETRACTING SECTIONAL RUNNING BOARD
                              Filed May 25, 1923        3 Sheets-Sheet 3
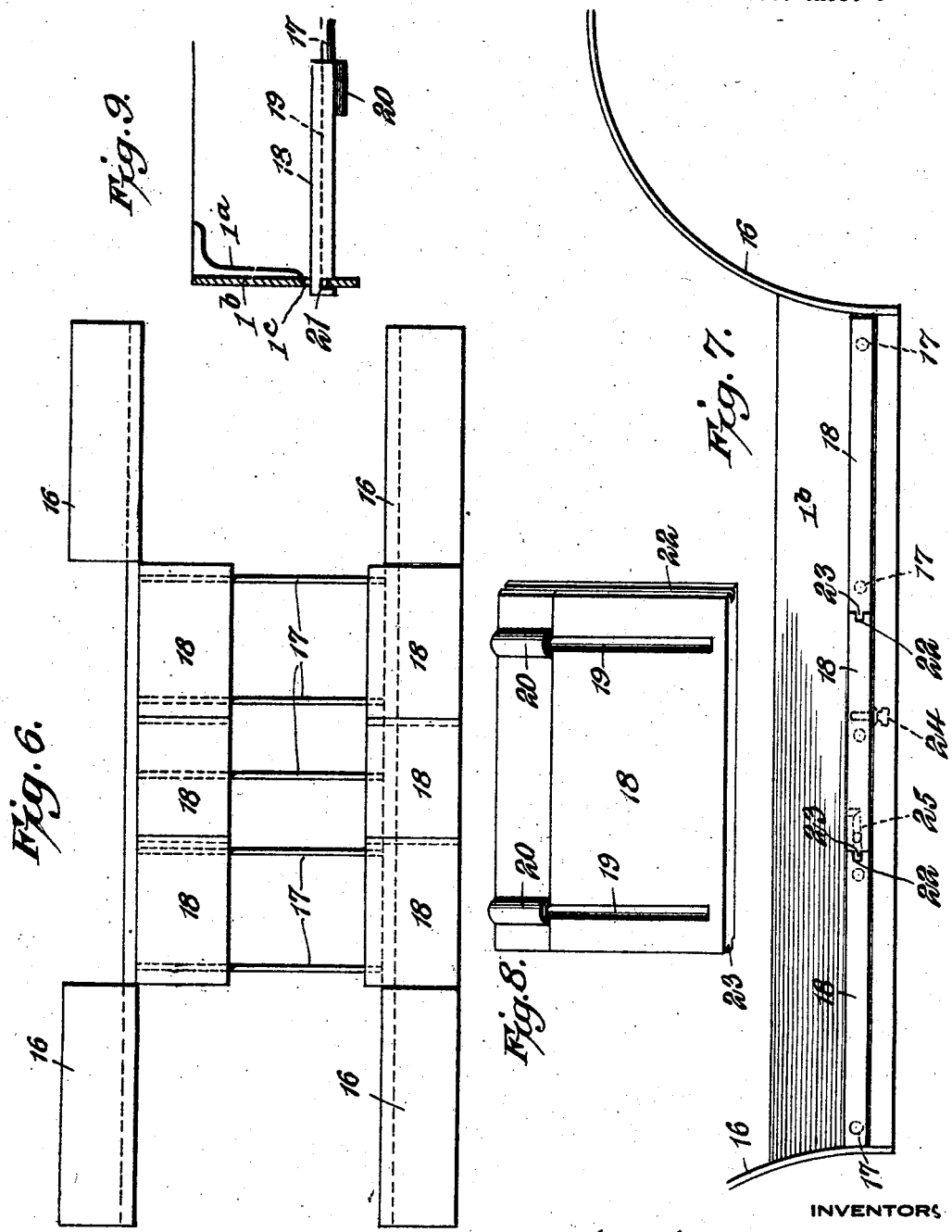
INVENTORS
W. H. Cleveland and
C. W. Bothe
BY
James J. Sheety & Co.
ATTORNEYS Patented Mar. 15, 1927.

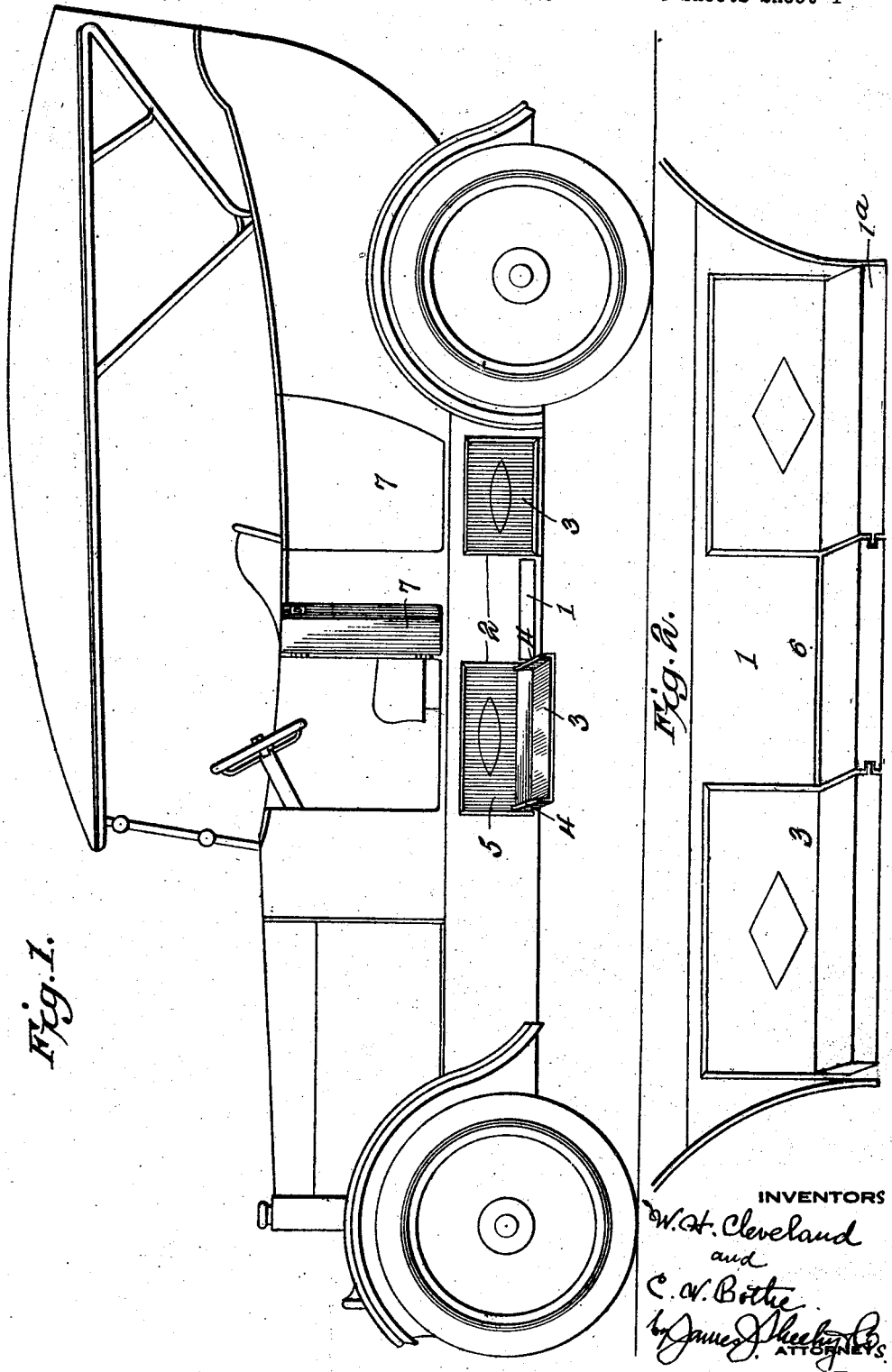

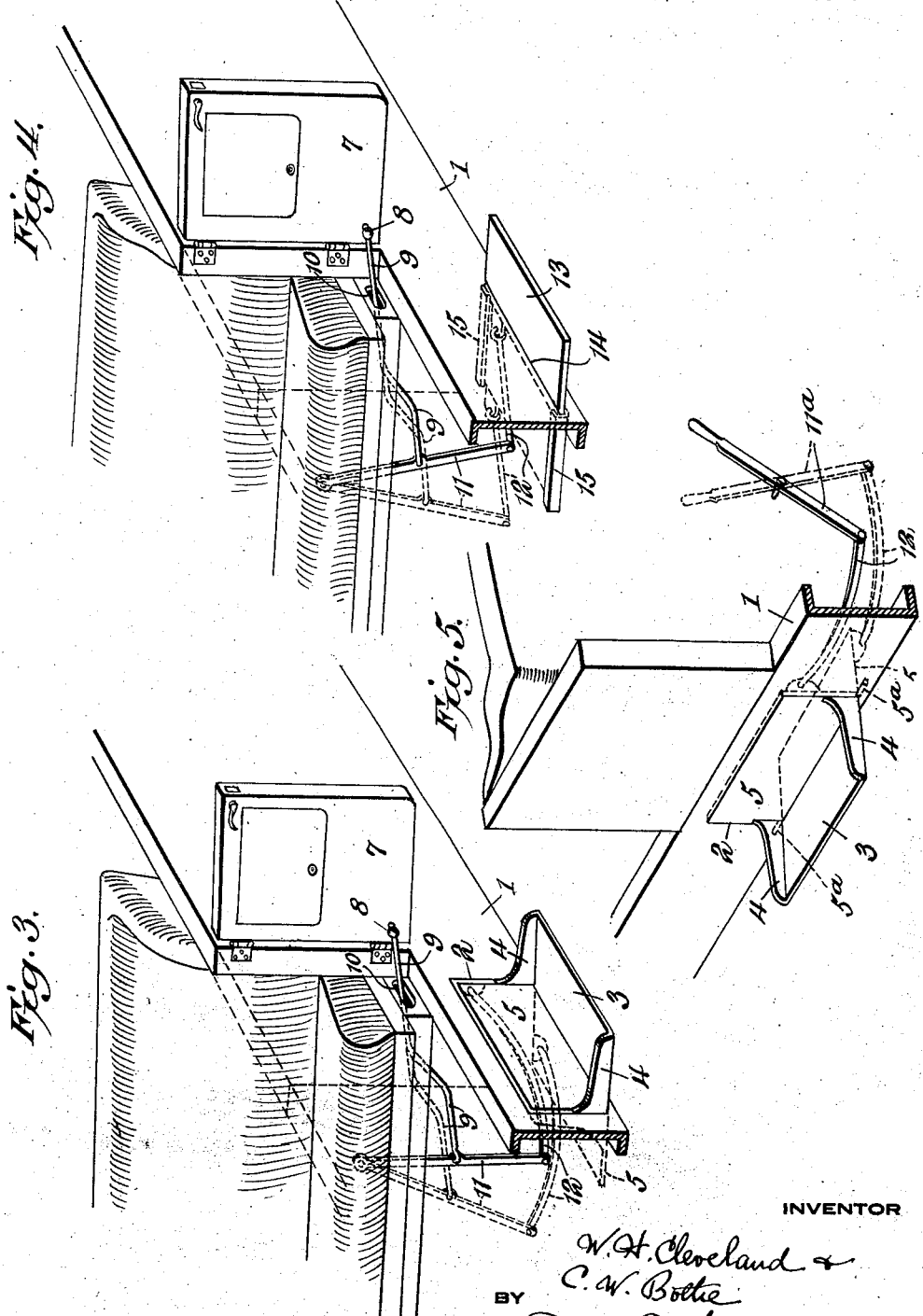

1,621,479

UNITED STATES PATENT OFFICE.

WILLIAM H. CLEVELAND AND CLARENCE W. BOTHE, OF WELLINGTON, KANSAS.

RETRACTING SECTIONAL RUNNING BOARD.

Application filed May 25, 1923. Serial No. 641,496.

Our present invention pertains to vehicle bodies and it contemplates the provision in a vehicle body of means whereby when the door thereof is opened the step will automatically assume the proper position and when the door is closed the step will be concealed from view.

The invention further contemplates the provision of means whereby the steps and running board of the vehicle are securely housed and invisible when the door is closed thereby leaving the sides of the vehicle clear of foothold and adding materially to the symmetrical and luxurious appearance of the vehicle as well as affording assurance to the occupants of the car, individual and seclusive protection from intrusion by malicious or uninvited persons who might step on the running board. The invention naturally lessens the liability of accident by preventing attempted entry into the car while same is in motion and eliminates riding of persons on the running board instead of inside the vehicle.

The invention further contemplates the provision of a running board to be used in conjunction with the steps of a vehicle that is adapted for ready use and adjustment.

Further advantageous characteristics and objects of the invention will be fully understood from the following description and claims when the same are read in connection with the drawings accompanying and forming part of the specification, in which—

Figure 1 is a side elevation of a motor vehicle and showing one step in position and the other step concealed.

Figure 2 is a detail view of the apron of the vehicle and the steps.

Figure 3 is a perspective view of a vehicle equipped with our novel step.

Figure 4 is a detail view of a sliding construction of step.

Figure 5 is a detail perspective of the mechanism that actuates the doors and steps.

Figure 6 is a top plan view of a running board constructed along the lines of my novel invention.

Figure 7 is a side elevation of the construction shown in Figure 6.

Figure 8 is a bottom plan view of one of the steps used in the construction shown in Figure 6.

Figure 9 is a sectional view of the movable step and showing its relation to guide bars of the running board.

Similar numerals of reference designate corresponding parts in all the views of the drawings.

Our novel construction is adapted to be installed in new vehicles at the time of manufacture or may be placed in automobiles at any time after manufacture and as shown in Figure 1 the apron 1 is cut so as to receive the movable steps. These steps comprise two sections 3 and 5 that are at right angles to each other and the upturned edge portions 4 that add to the finished appearance of the vehicle. It will be seen that the cut out portion 2 of the apron are so constructed that if open or closed a snug fit around the step element is always made.

The running-board is arranged between the steps and said steps operate in conjunction with the doors 7. This is accomplished by means of the rod 9 that passes beneath the seat of the vehicle through slot 10 and the rod is secured to the door 7 by ball and socket construction 8. The rod 9 is secured to a hidden shaft or rod 11 that is secured to the rod or arm 12 that in turn is secured to the portion 5 of the step.

Between the steps 3 we provide a short running board 6 which is not connected to the steps when inwardly but forming a continuous running board when positioned outwardly with steps.

As it will be seen by reference to Figure 5 the elements 3 and 5 comprising the steps are hinged to the apron by means of the hinge 5$^a$.

By reference to Figure 5 it will also be seen that if desired the form of rod 11$^a$ may be used in lieu of the rod 11 of Figure 3.

By use of this construction of lever 11$^a$ the step 3 may be operated by hand independently of the door because unlike lever 11 the lever 11$^a$ is not secured to the door but to the step only. Manifestly the lever 11$^a$ may be positioned back of the seat and at any convenient point in reach of the occupant.

When an automobile is equipped with the construction shown in Figures 3 and 4, movement of the door 7 will be attended by movement of the step. The door being closed will move rod 9 to the dotted line position (Figure 3) and the step to a similar position. This construction is extremely simple and inexpensive and is positive in operation.

In Figure 4 we show a slightly modified form of construction in which a stationary housing 15 having a slot 14 is arranged in the apron 1 and a sliding step 13 is employed in lieu of the radiating step shown in Figure 3. This construction of elements operates exactly the same as the preferred elements except that the step slides in the casing 15 instead of revolving as does step of Figure 3.

In Figures 6 to 9 we show steps to be used in conjunction and to produce a running board.

In this construction the mud guards of the vehicle are indicated by 16 while the apron is indicated by 1ᵇ. The guide rods 17 extend completely across the vehicle body and the steps are provided with an inner collar 20 and an outer turned down portion 21. The brace 1ᵃ of the apron 1ᵇ strengthens same and said apron is provided with a slot 1ᶜ through which the steps travel. These forms of steps are provided with grooves 22 and tongues 23 whereby each step slides on its opposing step and in order to prevent casual sliding of the steps locks 25 and the thumb screw 24 are employed.

The elements entering into the construction set forth are extremely simple and inexpensive to produce and because of their simple construction are not liable to become inoperative after a short period of use.

There is no doubt that the elements will naturally enhance, rather than detract from the finished appliance of the vehicle.

Having described our invention, what we claim and desire to secure by Letters Patent is:—

1. In combination with an automobile having a body an apron projecting downward from the body and having front and rear mud guards, of a sectional running board capable of being positioned within the apron when not in use, and of being positioned outwardly from the apron to form a continuous running board extending from the front to the rear mud guards.

2. In combination with an automobile having a body with one or more doors, an apron projecting downwardly from the body and having front and rear mud guards of a running board consisting of a front, a rear and an intermediate section, all of said sections capable of being positioned within the apron and of being positioned outwardly, therefrom, one or more of said sections being operatively connected with the said doors, the sections when positioned outwardly forming a continuous running board extending from the front to the rear mud guards.

In testimony whereof we have hereunto set our hands.

WILLIAM H. CLEVELAND.
CLARENCE W. BOTHE.